(12) United States Patent
Chu et al.

(10) Patent No.: US 7,663,963 B2
(45) Date of Patent: Feb. 16, 2010

(54) APPARATUS AND METHOD FOR PROVIDING MULTIPLE READS/WRITES USING A 2READ/2WRITE REGISTER FILE ARRAY

(75) Inventors: Sam Gat-Shang Chu, Round Rock, TX (US); Maureen Anne Delaney, Richmond, VT (US); Saiful Islam, Austin, TX (US); Dung Quoc Nguyen, Austin, TX (US); Jafar Nahidi, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/134,537

(22) Filed: Jun. 6, 2008

(65) Prior Publication Data

US 2008/0239860 A1      Oct. 2, 2008

Related U.S. Application Data

(63) Continuation of application No. 11/054,276, filed on Feb. 9, 2005, now Pat. No. 7,400,548.

(51) Int. Cl.
*G11C 8/00*      (2006.01)

(52) U.S. Cl. .................... 365/230.03; 365/189.02; 365/230.02; 365/230.05

(58) Field of Classification Search .................. 710/51; 711/149
See application file for complete search history.

(56) References Cited

U.S. PATENT DOCUMENTS

| | | | |
|---|---|---|---|
| 4,847,759 A | 7/1989 | Oklobdzija | |
| 4,933,909 A | 6/1990 | Cushing et al. | |
| 6,115,280 A * | 9/2000 | Wada | 365/78 |
| 7,243,209 B2 * | 7/2007 | Chu et al. | 711/211 |

* cited by examiner

*Primary Examiner*—Tan T. Nguyen
(74) *Attorney, Agent, or Firm*—Diana R. Gerhardt; Stephen J. Walder, Jr.

(57) ABSTRACT

An apparatus and method are provided for reading a plurality of consecutive entries and writing a plurality of consecutive entries with only one read address and one write address using a 2Read/2Write register file. In one exemplary embodiment, a 64 entry register file array is partitioned into four sub-arrays. Each sub-array contains sixteen entries having one or more 2Read/2Write SRAM cells. The apparatus and method provide a mechanism to write the consecutive entries by only having a 4 to 16 decode of one address. In addition, the apparatus and method provide a mechanism for reading data from the register file array using a starting read word address and two read word lines generated based on the starting read word address. The two read word lines are used to access the two read ports of the entries in the sub-arrays.

17 Claims, 10 Drawing Sheets

| SUB-ARRAY 0 GROUP 0 AND 4 | |
|---|---|
| 0wr0 | 0rd0 |
| 0wr1 | 0rd1 |
| 4wr0 | 4rd0 |
| 4wr1 | 4rd1 |
| 8wr0 | 8rd0 |
| 8wr1 | 8rd1 |
| 12wr0 | 12rd0 |
| 12wr1 | 12rd1 |
| 16wr0 | 16rd0 |
| 16wr1 | 16rd1 |
| 20wr0 | 20rd0 |
| 20wr1 | 20rd1 |
| ⋮ | ⋮ |
| 56wr0 | 56rd0 |
| 56wr1 | 56rd1 |
| 60wr0 | 60rd0 |
| 60wr1 | 60rd1 |

| SUB-ARRAY 2 GROUP 2 AND 6 | |
|---|---|
| 2wr0 | 2rd0 |
| 2wr1 | 2rd1 |
| 6wr0 | 6rd0 |
| 6wr1 | 6rd1 |
| 10wr0 | 10rd0 |
| 10wr1 | 10rd1 |
| 14wr0 | 14rd0 |
| 14wr1 | 14rd1 |
| 18wr0 | 18rd0 |
| 18wr1 | 18rd1 |
| 22wr0 | 22rd0 |
| 22wr1 | 22rd1 |
| ⋮ | ⋮ |
| 58wr0 | 58rd0 |
| 58wr1 | 58rd1 |
| 62wr0 | 62rd0 |
| 62wr1 | 62rd1 |

| SUB-ARRAY 1 GROUP 1 AND 5 | |
|---|---|
| 1wr0 | 1rd0 |
| 1wr1 | 1rd1 |
| 5wr0 | 5rd0 |
| 5wr1 | 5rd1 |
| 9wr0 | 9rd0 |
| 9wr1 | 9rd1 |
| 13wr0 | 13rd0 |
| 13wr1 | 13rd1 |
| 17wr0 | 17rd0 |
| 17wr1 | 17rd1 |
| 21wr0 | 21rd0 |
| 21wr1 | 21rd1 |
| ⋮ | ⋮ |
| 57wr0 | 57rd0 |
| 57wr1 | 57rd1 |
| 61wr0 | 61rd0 |
| 61wr1 | 61rd1 |

| SUB-ARRAY 3 GROUP 3 AND 7 | |
|---|---|
| 3wr0 | 3rd0 |
| 3wr1 | 3rd1 |
| 7wr0 | 7rd0 |
| 7wr1 | 7rd1 |
| 11wr0 | 11rd0 |
| 11wr1 | 11rd1 |
| 15wr0 | 15rd0 |
| 15wr1 | 15rd1 |
| 19wr0 | 19rd0 |
| 19wr1 | 19rd1 |
| 23wr0 | 23rd0 |
| 23wr1 | 23rd1 |
| ⋮ | ⋮ |
| 59wr0 | 59rd0 |
| 59wr1 | 59rd1 |
| 63wr0 | 63rd0 |
| 63wr1 | 63rd1 |

*FIG. 4*

APPARATUS AND METHOD FOR PROVIDING MULTIPLE READS/WRITES USING A 2READ/2WRITE REGISTER FILE ARRAY

This application is a continuation of application Ser. No. 11/054,276, filed Feb. 9, 2005, now U.S. Pat. No. 7,400,548.

BACKGROUND OF THE INVENTION

1. Technical Field

The present invention relates generally to an improved data processing system and method. More specifically, the present invention provides an apparatus and method for providing multiple reads/writes using a 2Read/2Write register file array.

2. Description of Related Art

The basic structure of a conventional computer system includes one or more processing units connected to various input/output devices for the user interface (such as a display monitor, keyboard and graphical pointing device), a permanent memory device (such as a hard disk, or a floppy diskette) for storing the computer's operating system and user programs, and a temporary memory device (such as random access memory or RAM) that is used by the processor(s) in carrying out program instructions. The evolution of computer processor architectures has transitioned from the now widely-accepted reduced instruction set computing (RISC) configurations, to so-called superscalar computer architectures, wherein multiple and concurrently operable execution units within the processor are integrated through a plurality of registers and control mechanisms.

An illustrative embodiment of a conventional processing unit is shown in FIG. 1, which depicts the architecture for a PowerPC™ microprocessor 12 manufactured by International Business Machines Corporation. Microprocessor 12 operates according to reduced instruction set computing (RISC) and is a single integrated circuit superscalar microprocessor. The system bus 20 is connected to a bus interface unit (BIU) of microprocessor 12. Bus 20, as well as various other connections described, include more than one line or wire, e.g., the bus could be a 32-bit bus.

BIU 30 is connected to an instruction cache 32 and a data cache 34. The output of instruction cache 32 is connected to a sequencer unit 36. In response to the particular instructions received from instruction cache 32, sequencer unit 36 outputs instructions to other execution circuitry of microprocessor 12, including six execution units, namely, a branch unit 38, a fixed-point unit A (FXUA) 40, a fixed-point unit B (FXUB) 42, a complex fixed-point unit (CFXU) 44, a load/store unit (LSU) 46, and a floating-point unit (FPU) 48.

The inputs of FXUA 40, FXUB 42, CFXU 44 and LSU 46 also receive source operand information from general-purpose registers (GPRs) 50 and fixed-point rename buffers 52. The outputs of FXUA 40, FXUB 42, CFXU 44 and LSU 46 send destination operand information for storage at selected entries in fixed-point rename buffers 52. CFXU 44 further has an input and an output connected to special-purpose registers (SPRs) 54 for receiving and sending source operand information and destination operand information, respectively. An input of FPU 48 receives source operand information from floating-point registers (FPRs) 56 and floating-point rename buffers 58. The output of FPU 48 sends destination operand information to selected entries in rename buffers 58.

Microprocessor 12 may include other registers, such as configuration registers, memory management registers, exception handling registers, and miscellaneous registers, which are not shown. Microprocessor 12 carries out program instructions from a user application or the operating system, by routing the instructions and data to the appropriate execution units, buffers and registers, and by sending the resulting output to the system memory device (RAM), or to some output device such as a display console.

A high-level schematic diagram of a typical general-purpose register 50 is further shown in FIG. 2. GPR 50 has a block 60 labeled "MEMORY_ARRAY_80×64," representing a register file with 80 entries, each entry being a 64-bit wide word. Blocks 62a (WR0_DEC) through 62d (WR3_DEC) depict address decoders for each of the four write ports 64a-64d. For example, decoder 62a (WR0_DEC, or port 0) receives the 7-bit write address wr0_addr<0:6> (write port 64a). The 7-bit write address for each write port is decoded into 80 select signals (wr0_sel<0:79> through wr3_sel<0:79>). Write data inputs 66a-66d (wr0_data<0:63> through wr3_data<0:63>) are 64-bit wide data words belonging to ports 0 through 3 respectively. The corresponding select line 68a-68d for each port (wr0_sel<0:79> through wr3_sel<0:79>) selects the corresponding 64-bit entry inside array 60 where the data word is stored.

There are five read ports in this particular prior art GPR. Read ports 70a-70e (0 through 4) are accessed through read decoders 72a-72e (RD0_DEC through RD4_DEC), respectively. Select lines 74a-74e (rd0_sel<0:79> through rd4_sel<0:79>) for each decoder are generated as described for the write address decoders above. Read data for each port 76a-76e (rd0_data<0:63> through rd4_data<0:63>) follows the same format as the write data. The data to be read is driven by the content of the entry selected by the corresponding read select line.

Register files, such as the one described above, are a common type of storage circuitry used in modern day state-of-the-art microprocessors. For example, in a high performance processor application, in order to maximize the number of instructions executed concurrently and to provide high bandwidth to the instruction cache, a large register file, e.g., an instruction buffer (IBUF) supporting multiple simultaneous reads and writes is required. However, large register file arrays having multiple simultaneous reads and writes require a large SRAM cell area to support several read and write ports and a complex decoding scheme. The result is slow access and large register file array area. Therefore, it would be beneficial to have an improved apparatus and method for providing a multiple read/write register file in which area and access time is minimized.

SUMMARY OF THE INVENTION

The present invention provides an apparatus and method for providing multiple simultaneous reads/writes, i.e. more than 2 simultaneous reads/writes, per instruction cycle using a 2Read/2Write array when the input data (instructions in the exemplary embodiments) have consecutive addresses. With the present invention, an apparatus and method are provided for reading a plurality of consecutive entries and write a plurality of consecutive entries with only one read address and one write address using the 2Read/2Write register file.

In one exemplary embodiment, a 64 entry register file array is partitioned into four sub-arrays. Each sub-array contains sixteen entries of some number of 2Read/2Write SRAM cells. In this exemplary embodiment, eight consecutive instructions are written into this register file array from the instruction cache. Similarly, on a read, five consecutive instructions are read out of the register file array. For the data to be written to the register file array, the data must be aligned based on the requested starting instruction and the first open cell of the register file array. Therefore, a conventional rotator multiplexer, consisting of eight 4:1 multiplexers, ahead of this register file exists to align the data.

For the sequential read or write of a 64 entry register file array, a traditional decoder would use a full 6 to 64 word line decode for the first address. Subsequent addresses would require an adder, incrementer, or shifter to get the remaining read/write addresses. With the present invention, however, a method to read/write the consecutive entries by only having a 4 to 16 decode of one address, e.g., the first address of the consecutive read/write, is provided. The decode methodology of the exemplary embodiments of the present invention is simplifierd by arranging all the entries into sub-arrays and groups.

While the exemplary embodiments are directed to a system in which five consecutive instructions are read from the register file array, in other implementations and embodiments of the present invention may make use of greater or fewer numbers of consecutive instructions being read from the register file array. In such implementations, fewer or additional ways for storing instructions in the register file array may be taken into consideration by the mechanisms of the present invention.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an exemplary diagram illustrating the read and write ports of each cell in each sub-array of the register file array shown in FIG. 3;

DETAILED DESCRIPTION OF THE PREFERRED EMBODIMENT

The present invention provides a mechanism for providing a 2Read/2Write register file array in which multiple, i.e. more than two, simultaneous read/writes are performed per instruction cycle. With the exemplary embodiments of the present invention, the register file array is partitioned into four sub-arrays, each sub-array having sixteen entries, each entry having one or more cells, e.g., SRAM cells, and each cell having two read and two write ports. The instruction buffer is provided with a plurality of input multiplexers for writing instructions to sub-arrays using the two write ports for each entry. Another plurality of output multiplexers are provided for receiving the output from the sub-arrays of the register file array and generating the output read data from the register file array.

The outputs from read ports 0 of entries in a sub-array are dotted together and stored in a latch prior to being output to the output multiplexers. Similarly, the outputs from the read ports 1 of the entries in the sub-array are dotted together and stored in another latch prior to being output to the output multiplexers. Thus, each sub-array in the register file array provides two read outputs for a total of eight read outputs. These eight read outputs are provided to the output multiplexers based on a determined set of possible combinations of outputs to provide the required read data. That is, the particular multiplexer(s) to which an output from a sub-array is provided, and the order in which outputs from the sub-arrays are provided to each multiplexer, is determined based on the set of possible combinations of outputs that may be used to generate the required read data. With this arrangement, eight write and five read operations may be performed in a single instruction cycle using a 2Read/2Write register file array.

Prior to providing a more detailed explanation of the arrangement and operation of the present invention, it is first helpful to understand the operation of a register file array and the way in which a register file array is partitioned in accordance with the present invention. The register file array according to the present invention provides a wrap capability, meaning that once a last entry of the register file array is accessed the next access goes back to the first entry of the array. In addition, to facilitate the operation of the present invention, the register file array is partitioned into groups of register file array entries, and sub-arrays of groups. This arrangement of register file array entries permits the multiple writing and reading, i.e. greater than 2 writes and 2 reads, of data from the register file array using the mechanisms of the present invention, as discussed hereafter.

Figure 1:
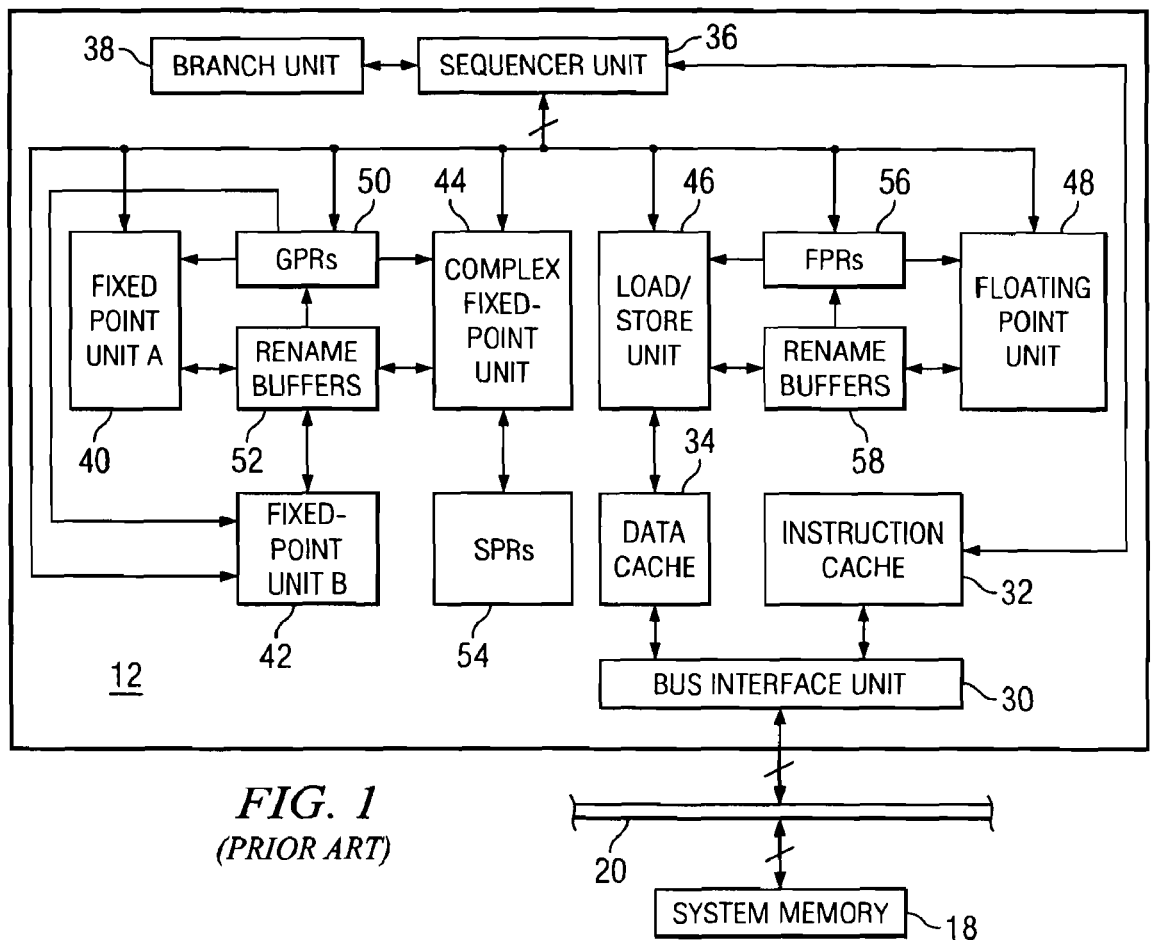
FIG. 1 is an exemplary block diagram of a processor in which an exemplary embodiment of the present invention may be implemented.
Figure 2A:
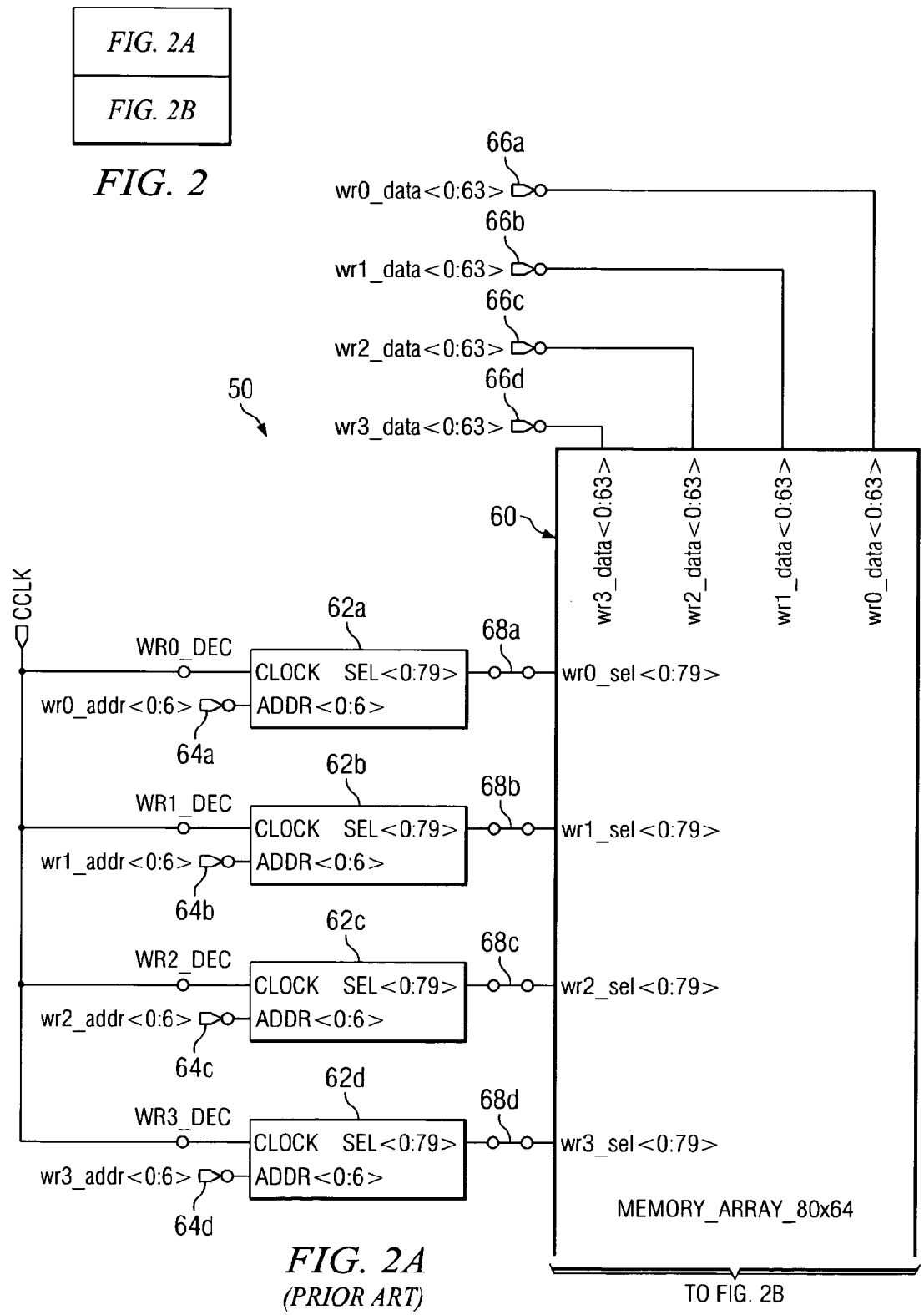
FIGS. 2A and 2B is a high-level schematic diagram of a typical general-purpose register.
Figure 2B:
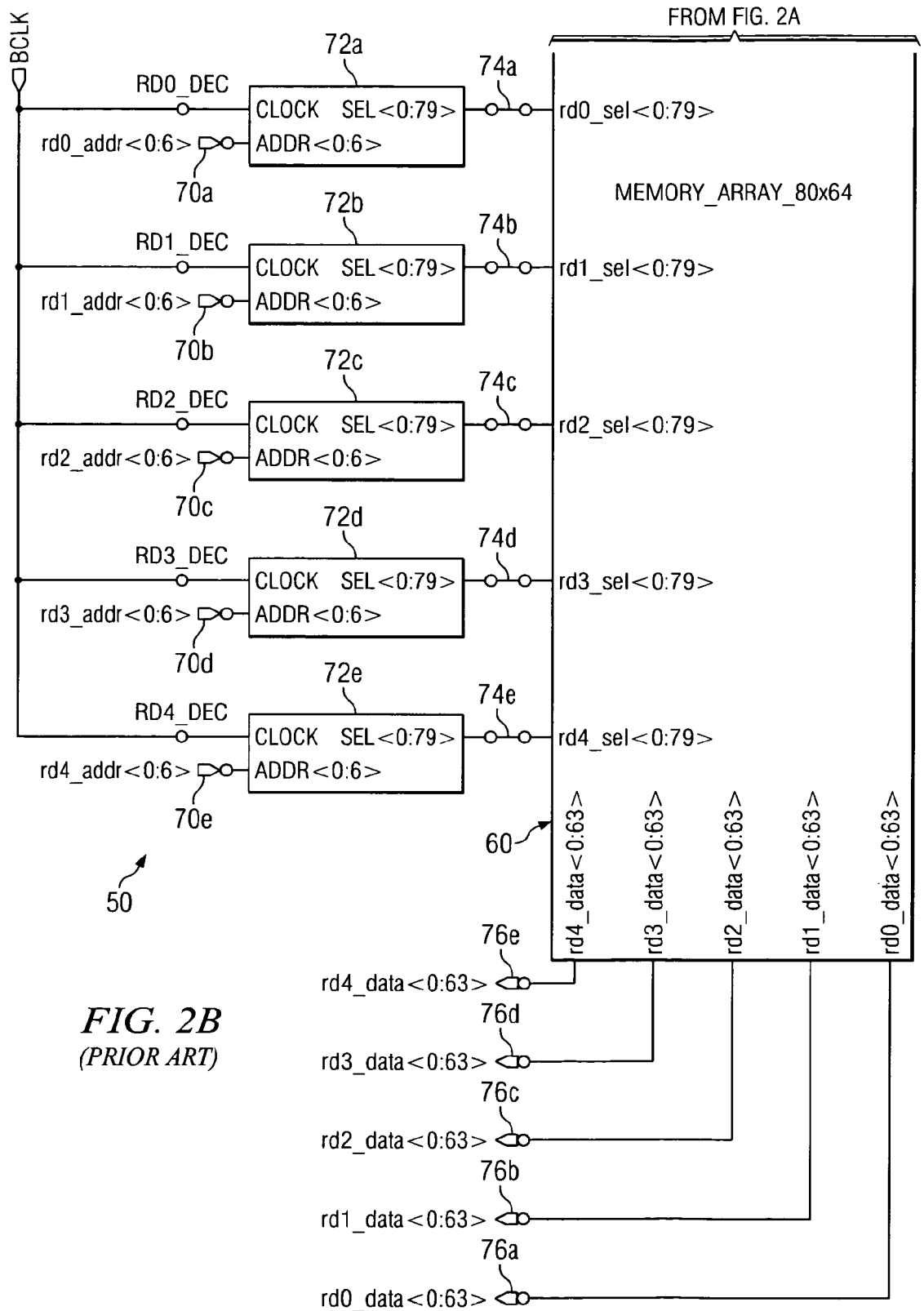
Figures 3, 5A:
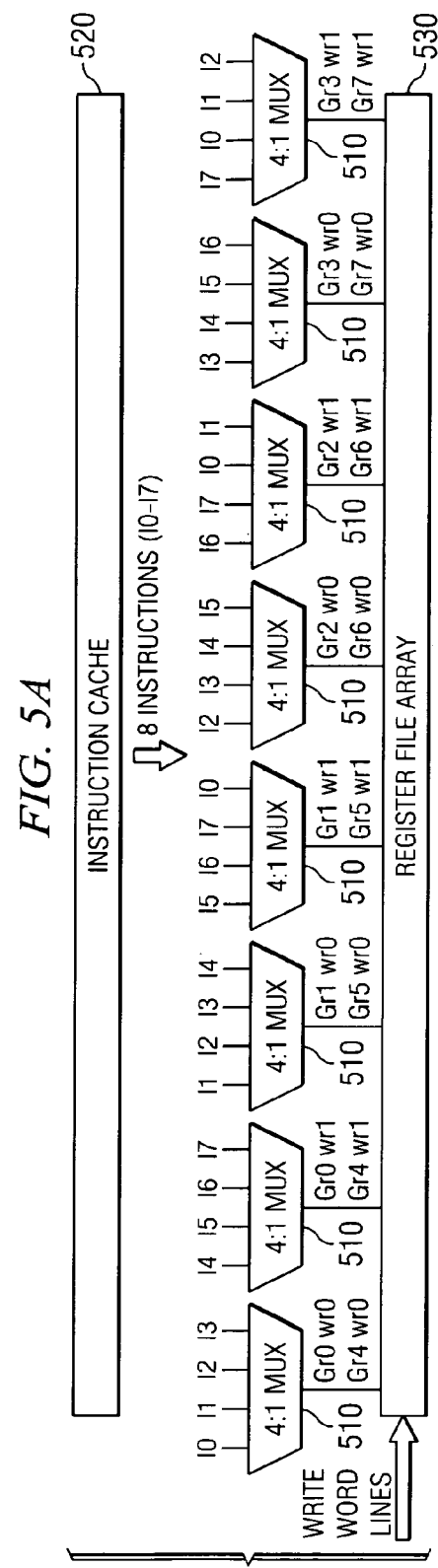
FIG. 3 is an exemplary diagram illustrating a register file array partitioned into four sub-arrays, each having sixteen entries with a number of 2Read/2Write cells in accordance with one exemplary embodiment of the present invention.
FIG. 5A is an exemplary block diagram illustrating the alignment multiplexers for writing data to the register file array in accordance with one exemplary embodiment of the present invention.

FIG. 3 is an exemplary diagram illustrating a register file array partitioned into four sub-arrays, each having sixteen entries, each entry having cells with two read ports and two write ports in accordance with one exemplary embodiment of the present invention. As shown in FIG. 3, a register file array according to the present invention is partitioned into eight groups 310-380 and four sub-arrays 392-398. Each group contains eight entries with each entry having cells with two write ports and two read ports, as opposed to the traditional register file arrays in which greater than two read and write ports are utilized to achieve more than two reads and writes per instruction cycle.

The eight groups 310-380 are combined into sub-arrays wherein each sub-array contains two groups. For example, sub-array 0 392 includes groups 0 and 4, sub-array 1 394 includes groups 1 and 5, sub-array 2 396 includes groups 2 and 6, and sub-array 3 398 includes groups 3 and 7. The groups are assigned to sub-arrays based on the premise that the sub-array in which a read operation to the register file array starts is also the sub-array to which the last read of the read operation is directed. For example, for a five simultaneous read system, if a first read of a read operation starts with group 2 330 of sub-array 2 396, the fifth read will be directed to group 6 370 of sub-array 2 396. The reason for this arrangement will be made clear with regard to the discussion of the decoding scheme set forth hereafter.

FIG. 4 is an exemplary diagram illustrating the read and write ports of each entry in each sub-array of the register file array shown in FIG. 3. As shown in FIG. 4, each sub-array includes two groups of entries of the register file array and thus, is made up of 16 entries. Each entry has cells with two write ports, denoted wr0 and wr1, and two read ports, denoted rd0 and rd1. Thus, there are 32 inputs to each sub-array and 32 outputs from each sub-array. The inputs are coupled to a set of input multiplexers which, in one exemplary embodiment, receive instruction data from an instruction cache and select which instruction data is to be written into the entries of each sub-array, as discussed hereafter. The outputs of each sub-array are dotted together such that each sub-array essentially has two outputs. These two outputs are provided to output multiplexers which are used to generate the read data obtained from the register file array.

FIG. 5A is an exemplary block diagram illustrating the input multiplexers for writing data to the register file array in accordance with one exemplary embodiment of the present invention. As shown in FIG. 5A, a plurality of alignment 4:1 multiplexers 510 are provided between the instruction cache 520 and the register file array 530. These alignment 4:1 multiplexers 510 each receive four of the 8 instructions, denoted I0-I7, and multiplex these instructions for writing to entries in the register file array 530. Each alignment 4:1 multiplexer 510 has an output that is connected to 16 ports of the register file array 530. Thus, for example, the output of the first alignment 4:1 multiplexer 510 is coupled to group 0, write port 0 (8 connections) and group 4, write port 0 (8 connections). Since each group consists of 8 entries, the result is that the output of the first alignment 4:1 multiplexer 510 is coupled to write port 0 of each of the entries in group 0 and group 4 and the second multiplexer 510 is coupled to write port 1 of group 0 and group 4.

Whether the output of a particular multiplexer 510 is written to write port 0 of group 0 or write port 0 of group 4, for example, is dependent upon which write word line is currently enabled. In the normal case, i.e. no wrap of the register file array, write word line 0 is enabled for the first 4 entries and thus, the first alignment 4:1 multiplexer 510 will write its output to write port 0 of the cells in groups 0 to 3, while write word line 1 is enabled for groups 4 to 7. To write the wrapped data write word line 1 is enabled for groups 0 to 3 and thus, the second 4:1 multiplexer 510 outputs will be written to groups 0 to 3. Similarly, write word line 0 is enabled for groups 4 to 7 and thus, the first 4:1 multiplexer outputs will be written to groups 4 to 7. In this way, instruction data is written to cells of the register file array using the two write ports of the cells.

Figure 5B:
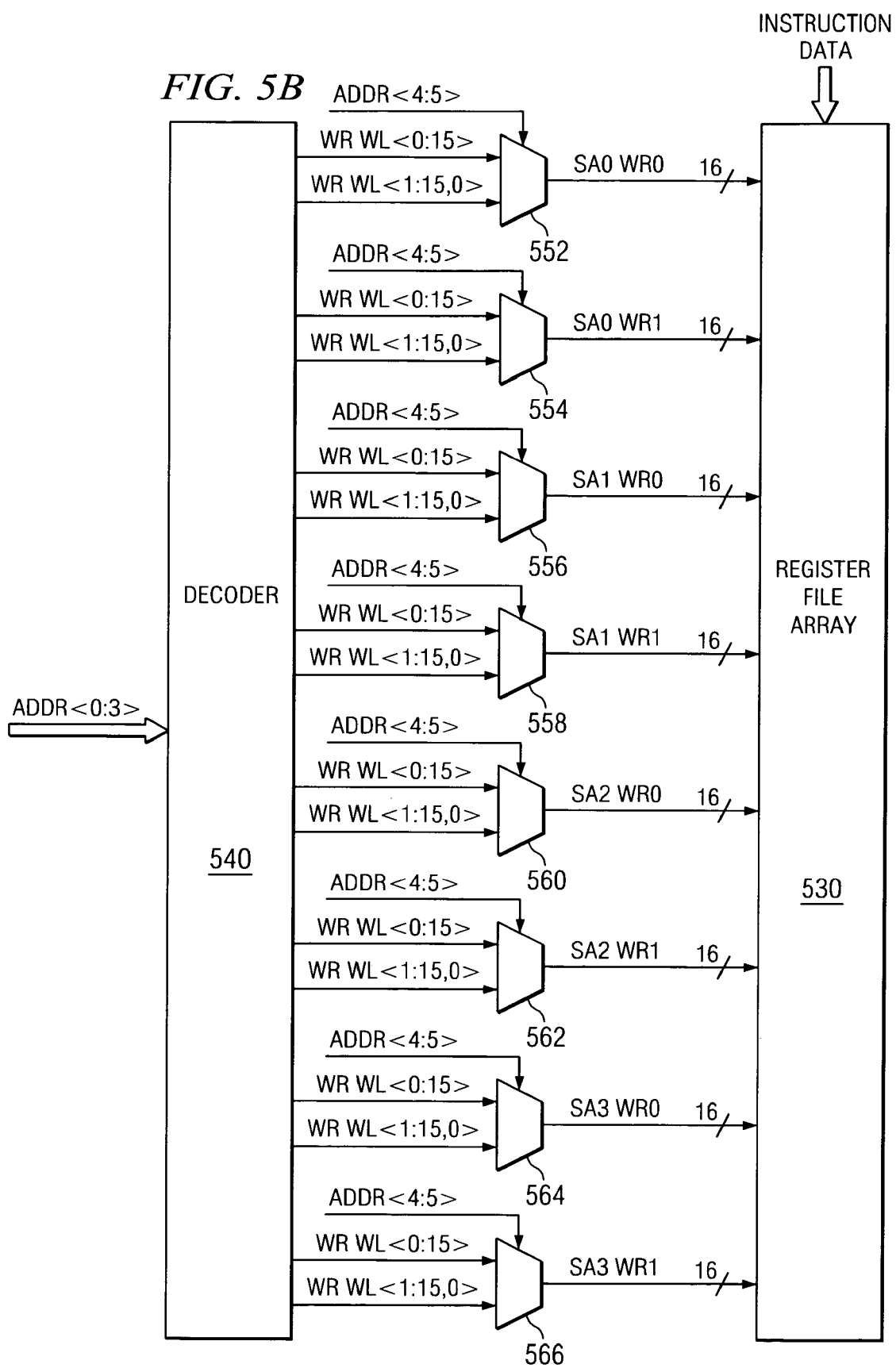
FIG. 5B is an exemplary diagram illustrating a write word line decoder in accordance with one exemplary embodiment of the present invention.

FIG. 5B is an exemplary diagram illustrating a write word line decoder in accordance with one exemplary embodiment of the present invention. As shown in FIG. 5B, a single starting write address ADDR is provided. The first four bits, i.e. bits 0:3, of the starting write address ADDR are provided to the decoder 540 which decodes these bits to generate write word line WR WL<0:15> and shifted write word line WR WL<1:15,0>. The write word line and shifted write word line are provided to 2:1 multiplexers 552-566. In addition, Bits 4 and 5 of the starting write address ADDR are provided to the multiplexers 552-566 as select signals. Based on the value of the select signals ADDR<4:5>, the multiplexers 552-566 output either the write word line or the shifted write word line as outputs SA0 WR0 to SA3 WR1.

The output SA0 WR0 represents a write word line for enabling write port 0 of sub-array 0. Similarly, output SA0 WR1 represents a write word line for enabling write port 1 of sub-array 0. The other outputs follow similar naming convention, i.e. SA2 WR1 represents a write word line for enabling write port 1 of sub-array 2. Based on these outputs, a write port of each sub-array may be enabled causing the instruction data being input by corresponding alignment 4:1 multiplexers 510 to be written to the entries and ports of the sub-arrays enabled by the write word lines. In this way, eight instructions may be written to the register file array during a single instruction cycle using a register file array having entries with only two write ports.

Figure 6:
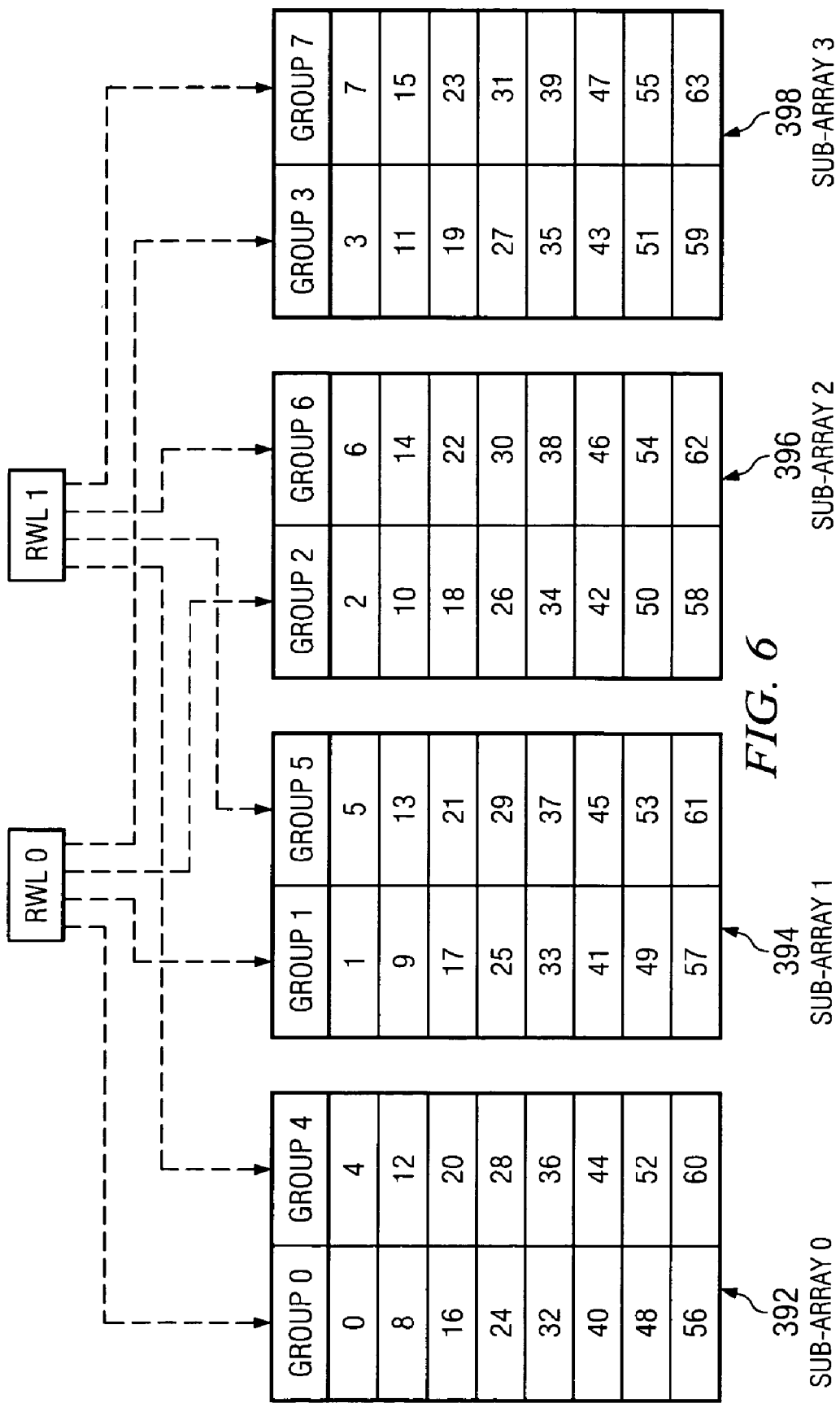
FIG. 6 is an exemplary diagram illustrating the sub-arrays of the register file array in FIG. 3 organized for explanation of reading data from the register file array.

FIG. 6 is an exemplary diagram illustrating the sub-arrays of the register file array in FIG. 3 organized for explanation of reading data from the register file array. The illustration in FIG. 6 corresponds to the register file array shown in FIG. 3 but is reorganized for ease in explaining reading of data from the register file array. As shown in FIG. 6, when read word line (rw1) 0 is enabled, data is read from a first group, e.g., groups 0, 1, 2 and 3, of the sub-arrays 392-398. When rw1 1 is enabled, data is read from the second group, e.g., groups 4, 5, 6 and 7, of sub-arrays 392-398. The present invention provides both rw1 0 and rw1 1 to register file array such that in the case of a wrap condition, data may be read from the next entry in the sub-array.

As an example, assume that, in an 8 write/5 read register file array system, a read operation is to start at entry 5 in group 5 of sub-array 394 in the register file array. With rw1 1 enabled, the data is read from entries 5, 6 and 7 in sub-arrays 394, 396 and 398. Since a wrap is required, rather than reading data from entries 0 and 1, rw1 1 is enabled causing the read operation to read data from entries 8 and 9 in groups 0 and 1 of sub-arrays 392 and 394. Thus, the read operation progresses from one sub-array to another reading data from the next entry in each group of the register file array. It should also be noted that the read operation starts and ends with the same sub-array, as discussed previously.

Figure 7:
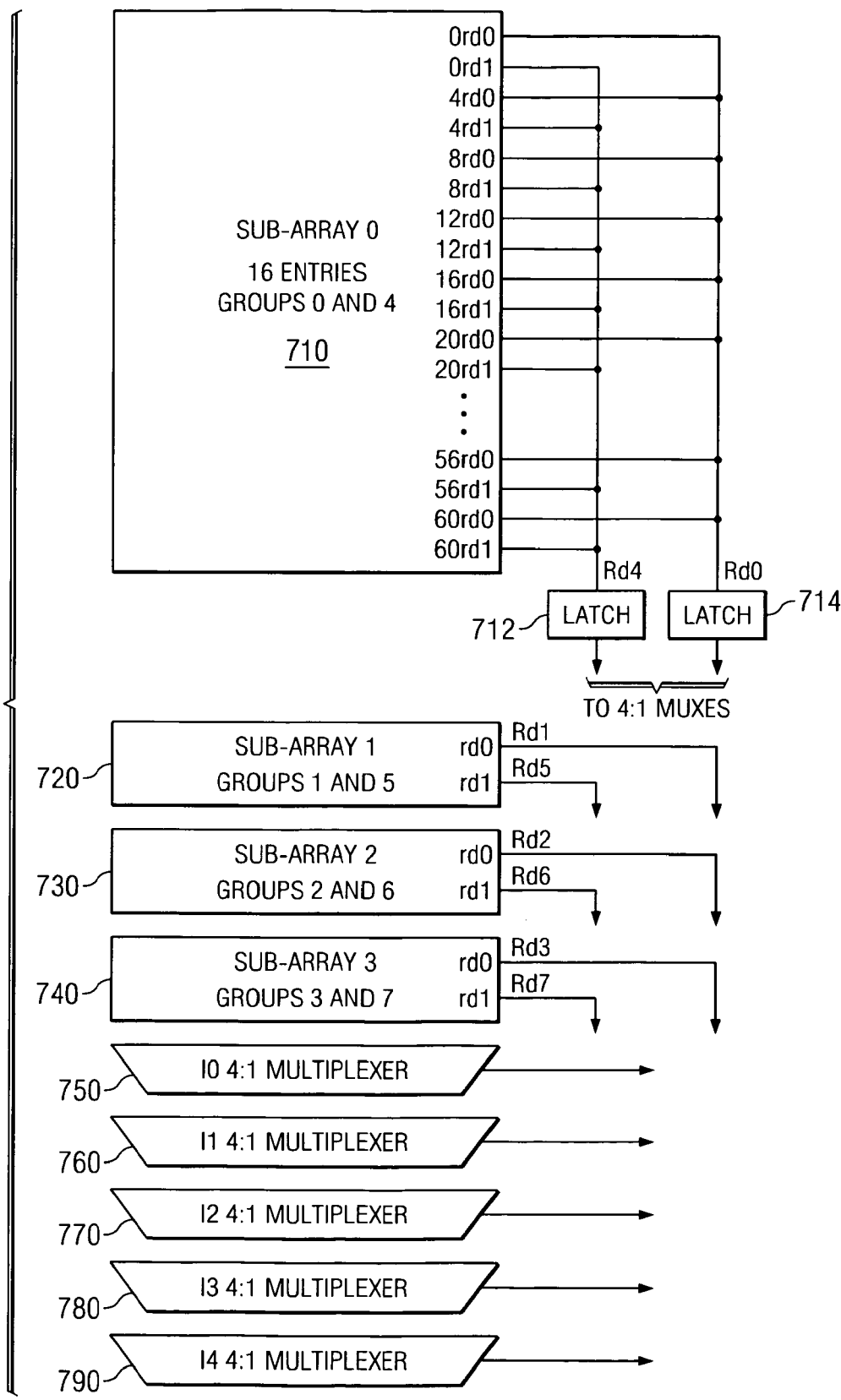
FIG. 7 is an exemplary block diagram illustrating a read side of the register file array in accordance with one exemplary embodiment of the present invention.

FIG. 7 is an exemplary block diagram illustrating a read side of the register file array in accordance with one exemplary embodiment of the present invention. It should be noted that read port detail is only shown for sub-array 1 710 in FIG. 7 for purposes of clarity of the drawing, however it should be appreciated that the other sub-arrays 720-740 have similar read port details.

As shown in FIG. 7, each of the read port 1 (rd1) outputs of the entries in the register file sub-array 1 710 are dotted together with the result being stored in latch 712. Similarly, each of the read port 0 (rd0) outputs of the cells in the register file sub-array 1 710 are dotted together with the result being stored in latch 714. These dotted outputs are labeled Rd4 and Rd0, respectively, in FIG. 7 and represent bit lines providing data read from sub-array 1 in the register file array.

In a similar manner, the outputs from read port 0 and read port 1 of the cells in the other sub-arrays 720-740 are dotted together to provide two outputs from each sub-array 710-740. The output from read port 0 for sub-array 1 720 is labeled Rd1 and the output from read port 1 for sub-array 1 720 is labeled Rd5. The output from read port 0 for sub-array 2 730 is labeled Rd2 and the output from read port 1 for sub-array 2 730 is labeled Rd6. The output from read port 0 for sub-array 3 740 is labeled Rd3 and the output from read port 1 for sub-array 3 740 is labeled Rd7. Thus, a total of 8 outputs, four from each of read port 0 and read port 1 of the sub-arrays 710-740, are output by the register file array during each instruction cycle. As with sub-array 0 710, each of the outputs from the sub-arrays 720-740 are stored in a latch (not shown) prior to being provided to output multiplexers 750-790.

The output multiplexers 750-790, in an exemplary embodiment, are 4:1 multiplexers which are used to output the five instructions/data used to perform five simultaneous reads from the register file array during a single instruction cycle. The output multiplexers 750-790 receive the outputs Rd0-Rd7 from the sub-arrays 710-740 of the register file array in accordance with a determined set of possible combinations for reading five consecutive entries from the register file array, as discussed hereafter.

In order to illustrate the operation of the present invention, assume that five consecutive entries in the register file array are to be read out during an instruction cycle, e.g., entries 14, 15, 16, 17 and 18 in the register file array. These entries are assigned as follows in the register file sub-arrays:

14=sub-array 2, group 6
15=sub-array 3, group 7
16=sub-array 0, group 0
17=sub-array 1, group 1
18=sub-array 2, group 2

With the arrangement of entries into sub-arrays in accordance with the present invention, as illustrated in FIGS. 3 and 6 for example, reading five consecutive entries means that the read operation will always read two entries from the starting sub-array and one entry from each of the other sub-arrays. Each entry read out will be from a different "group" in the sub-arrays.

As shown above, there are eight total read lines (2 from each sub-array) coming from the register file array, but only five have valid data at any time. That is, the starting read address provided to the array decoder identifies where in the register file array the reading of data is to start. Since the particular implementation described provides for an 8 write/5 read register file array, the total number of read lines containing valid data are five read lines starting with the read line providing the output from the start read address.

With the present invention, the first entry read from each sub-array will always go onto read port 0 (Rd0, Rd1, Rd2, Rd3). The fifth entry read, i.e. entry 18 in the above example, will always use read port 1 (Rd4, Rd5, Rd6, Rd7). As a result, there are only a small number of combinations for reading five consecutive entries.

Figure 8:
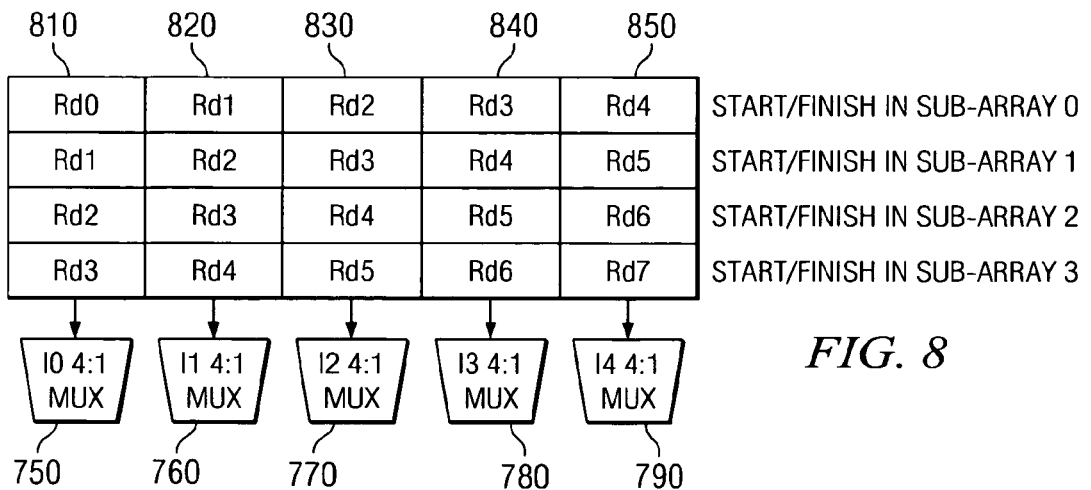
FIG. 8 is an exemplary diagram illustrating the four possible combinations of reading five consecutive entries.

FIG. 8 is an exemplary diagram illustrating the possible combinations of reading five consecutive entries. As shown in FIG. 8, the combinations for reading five consecutive entries are shown horizontally across FIG. 8 while the resulting sets of inputs 810-850 to multiplexers 750-790 are shown vertically. Thus, a first combination for reading five consecutive entries includes Rd0, Rd1, Rd2, Rd3 and Rd4. A second combination for reading five consecutive entries includes Rd1, Rd2, Rd3, Rd4 and Rd5. Similarly, the other two combinations include a combination of Rd2, Rd3, Rd4, Rd5 and Rd6 and a combination of Rd3, Rd4, Rd5, Rd6, and Rd7.

The above combinations give rise to five sets of inputs that may be provided to multiplexers 750-790 for outputting the instructions/data from the register file array. A first set 810 of inputs to the multiplexer 750 comprises outputs Rd0, Rd1, Rd2 and Rd3. A second set 820 of inputs to the multiplexer 760 comprises outputs Rd1, Rd2, Rd3 and Rd4. A third set 830 of inputs to the multiplexer 770 comprises outputs Rd2, Rd3, Rd4 and Rd5. A fourth set 840 of inputs to the multiplexer 780 comprises outputs Rd3, Rd4, Rd5 and Rd6. A fifth set 850 of inputs to multiplexer 790 comprises outputs Rd4, Rd5, Rd6 and Rd7. Therefore, each of the five instructions being read out in an instruction cycle, i.e. instructions I0-I4, takes its data from one of four read lines.

As a result, each of these possible combinations are provided as inputs to the five 4:1 output multiplexers 750-790 in FIG. 7. Select signals from the array decoder are generated based on the start read address and are provided to these 4:1 multiplexers 750-790, each of which receive the same select signals. The select signals identify which of the four input signals received by the respective 4:1 output multiplexers 750-790 are to be provided as output of the 4:1 output multiplexers 750-790. Thus, with the present invention, data from five consecutive register file array entries is read, starting with the start read address, and may be provided to an instruction decode unit for later use by processor execution units for processing.

Figure 9:
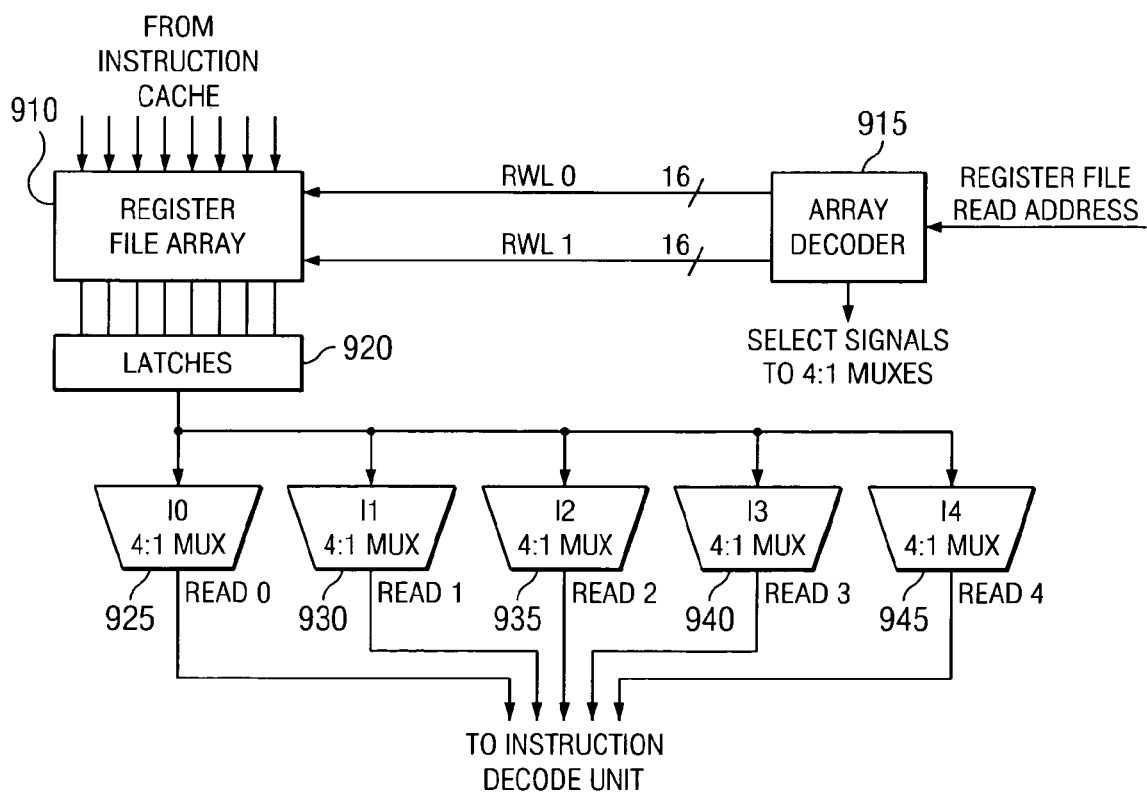
FIG. 9 is an exemplary diagram of a circuit for accessing a register file array in accordance with on exemplary embodiment of the present invention.

FIG. 9 is an exemplary diagram of a circuit for accessing a register file array in accordance with on exemplary embodiment of the present invention. As shown in FIG. 9, an array decoder 915 receives a register file array start read address and generates a first rwl 0 and second rwl 1 for accessing the register file array 910. Based on the rwl's, entries in register file array are read out and stored in latches 920 in the manner described above with regard to FIGS. 6 and 7. Referring again to FIG. 7, outputs Rd0-Rd7 are output from the sub-arrays of the register file array 910 and stored in the latches 920.

The 4:1 multiplexer 925 receives the inputs Rd0, Rd1, Rd2 and Rd3 in accordance with the combinations shown in FIG. 8. Similarly, the 4:1 multiplexer 930 receives the inputs Rd1, Rd2, Rd3 and Rd4, the 4:1 multiplexer 935 receives the inputs Rd2, Rd3, Rd4 and Rd5, and the 4:1 multiplexer 940 receives the inputs Rd3, Rd4, Rd5 and Rd6. The 4:1 multiplexer 945 receives inputs Rd4, Rd5, Rd6 and Rd7.

The 4:1 multiplexers 925-945 receive select signals from the array decoder 915 which controls the output of the 4:1 multiplexers 925-945. The outputs of the 4:1 multiplexers 925-945 may be provided to an instruction decode unit for later use by processor execution units for processing.

Figure 10:
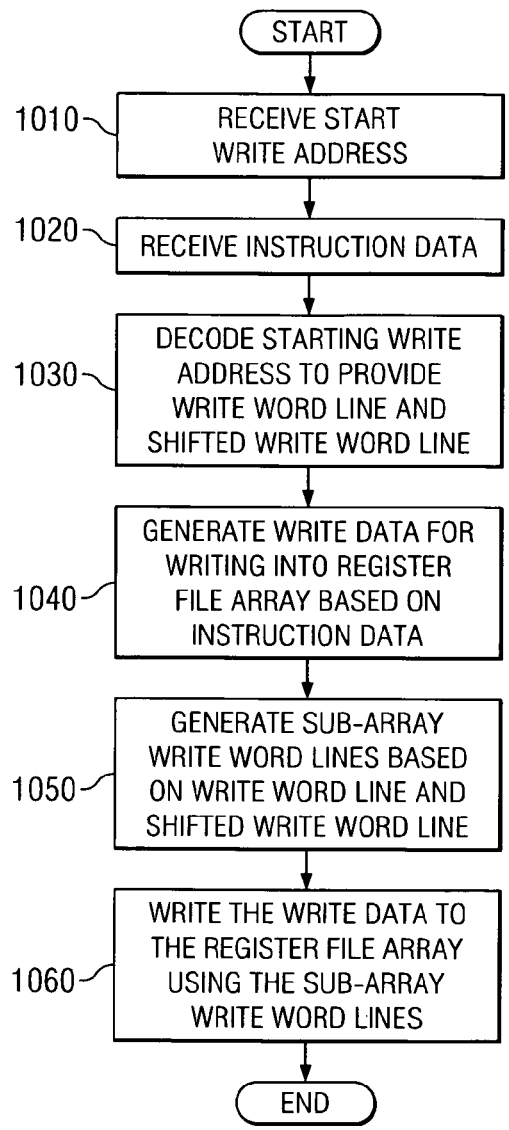
FIG. 10 is a flowchart outlining an exemplary write operation of one exemplary embodiment of the present invention.
Figure 11:
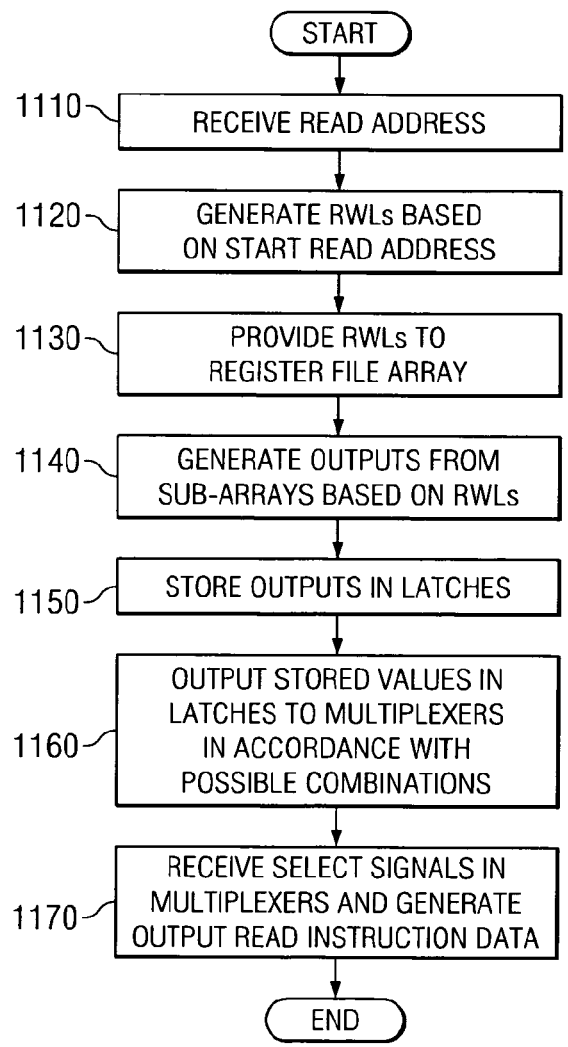
FIG. 11 is a flowchart outlining an exemplary read operation of one exemplary embodiment of the present invention.

FIGS. 10 and 11 illustrate exemplary operations of the present invention. It should be appreciated that while FIGS. 10 and 11 set forth a series of steps, the present invention is not limited to any particular order or arrangement of steps and many of the steps shown in FIGS. 10 and 11 may be performed in a different order or even in parallel with other steps of FIGS. 10 and 11. The series of steps shown in FIGS. 10 and 11 are only meant to be exemplary and are not intended to state or imply any particular limitation on the possible implementations of the present invention.

FIG. 10 is a flowchart outlining an exemplary operation of the present invention when writing data to a register file array. As shown in FIG. 10, the operation starts by receiving a starting write address (step 1010). Instruction data is received for writing to the register file array (step 1020). The starting write address is decoded to provide a write word line and a shifted write word line (step 1030). The instruction data is provided to alignment multiplexers which generate write data for writing to the register file array (step 1040). The write word line and shifted write word line are provided to multiplexers which generate sub-array write word lines to enable write ports of one or more sub-arrays in the register file array (step 1050). Based on the particular sub-array write word lines and the write data generated, the write data is written into the register file array (step 1060). The operation then terminates.

FIG. 11 is a flowchart outlining an exemplary operation of one exemplary embodiment of the present invention. As shown in FIG. 11, the operation starts by receiving a start read address (step 1110). First and Second read word lines rw1 0 and rw1 1 are generated based on the start read address (step 1120). The read word lines are provided to the register file array (step 1130) which generates outputs from the sub-arrays based on the read word lines and the start read address (step 1140). The outputs are stored in latches (step 1150) which then output the stored values to a set of multiplexers in accordance with determined possible combinations for reading consecutive entries in the register file array (step 1160).

The multiplexers receive select signals from an array decoder with a starting read address input, which causes the multiplexers to select particular inputs for output to an instruction decode unit for later use by processor execution units (step 1170). Thereafter, the operation terminates.

As a result of the above, a system that is capable of performing 8 writes and 5 reads per instruction cycle may be obtained using a 2Read/2Write register file array in accordance with the present invention. The present invention provides a less complex design that saves chip area, time and metal usage. The present invention saves area and metal usage in that many of the circuit elements required in conventional register file access mechanisms for decoding of read and write addresses may be eliminated from the design.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. An apparatus for accessing a register file array in a data processing system comprising:
a register file array having a plurality of entries, each entry having only two read ports and only two write ports;
a plurality of input alignment multiplexers, coupled to the register file array, for receiving data from a data source and generating outputs for writing portions of the received data to entries in the register file array using one of the two write ports for entries in the register file array; and
a plurality of output multiplexers coupled to the register file array, wherein outputs from the two read ports of the entries in the register file array are used to generate an input to one or more of the plurality of output multiplexers, and wherein the plurality of output multiplexers provide the data from entries of the register file array to an instruction decode unit of the data processing system.

2. The apparatus of claim 1, wherein that data is written to entries in the register file array in accordance with write word lines, wherein a first write word line is enabled for writes to a first port of each entry of each sub-array, and wherein a second write word line is enabled for writes to a second port of each entry of each sub-array.

3. The apparatus of claim 1, wherein the data source is an instruction cache, and wherein the register file array permits more than two writes of instruction data to the register file array and more than two reads of instruction data from the register file array in a single instruction cycle.

4. The apparatus of claim 1, wherein the plurality of entries in the register file array are partitioned into four sub-arrays, and wherein the output from a first read port of entries in a sub-array are combined together to generate a first sub-array output, and wherein the output from a second read port of entries in the sub-array are combined together to generate a second sub-array output.

5. The apparatus of claim 4, wherein the first sub-array output and second sub-array output are provided to one or more of the plurality of output multiplexers in accordance with a determined set of possible combinations of sub-array outputs for generating a predetermined number of read data outputs from the register file array.

6. The apparatus of claim 4, wherein a first sub-array of the register file array provides a zeroth sub-array output (Rd0) and a fourth sub-array output (Rd4), a second sub-array of the register file array provides a first sub-array output (Rd1) and a fifth sub-array output (Rd5), a third sub-array of the register file array provides a second sub-array output (Rd2) and a sixth sub-array output (Rd6), and a fourth sub-array of the register file array provides a third sub-array output (Rd3) and a seventh sub-array output (Rd7).

7. The apparatus of claim 6, wherein Rd0, Rd1, Rd2 and Rd3 are provided as inputs to a first output multiplexer, Rd1, Rd2, Rd3 and Rd4 are provided as inputs to a second output multiplexer, Rd2, Rd3, Rd4 and Rd5 are provided as inputs to a third output multiplexer, R3, Rd4, Rd5 and Rd6 are provided as inputs to a fourth output multiplexer, and Rd4, Rd5, Rd6 and Rd7 are provided as inputs to a fifth output multiplexer.

8. The apparatus of claim 7, wherein each of the first, second, third, fourth and fifth output multiplexers receive a select signal indicating which of the inputs provided to the multiplexers is to be output.

9. The apparatus of claim 8, wherein the select signals provided to the multiplexers are determined based on a start read address.

10. A method for accessing a register file array, having a plurality of entries in a data processing system comprising:
receiving, by a plurality of input multiplexers, data from a data source and generating outputs for writing portions of the received data to entries in the register file array using one of only two write ports associated with each entry in the register file array;
receiving a start read address for reading the data from the register file array;
generating a first read word line and a second read word line for reading the data from the register file array, each entry having only two read ports, and wherein a first read port of each entry is associated with the first read word line and a second read port of each entry is associated with the second read word line; and
reading the data from the register file array based on the start read address, the first read word line, and the second read word line to thereby generate data outputs from the register file array.

11. The method of claim 10, wherein the data outputs from the register file array are used to generate an input to one or more of a plurality of output multiplexers, and wherein the plurality of output multiplexers provide data from entries of the register file array to an instruction decode unit of the data processing system.

12. The method of claim 10, wherein the plurality of entries in the register file array are partitioned into four sub-arrays, and wherein the output from a first read port of entries in a sub-array are combined together to generate a first sub-array output, and wherein the output from a second read port of entries in the sub-array are combined together to generate a second sub-array output.

13. The method of claim 12, wherein the first sub-array output and second sub-array output are provided to one or more of the plurality of output multiplexers in accordance with a determined set of possible combinations of sub-array outputs for generating a predetermined number of read data outputs from the register file array.

14. The method of claim 12, wherein a first sub-array of the register file array provides a zeroth sub-array output (Rd0) and a fourth sub-array output (Rd4), a second sub-array of the register file array provides a first sub-array output (Rd1) and a fifth sub-array output (Rd5), a third sub-array of the register file array provides a second sub-array output (Rd2) and a sixth sub-array output (Rd6), and a fourth sub-array of the register file array provides a third sub-array output (Rd3) and a seventh sub-array output (Rd7).

15. The method of claim 14, wherein Rd0, Rd1, Rd2 and Rd3 are provided as inputs to a first output multiplexer, Rd1, Rd2, Rd3 and Rd4 are provided as inputs to a second output multiplexer, Rd2, Rd3, Rd4 and Rd5 are provided as inputs to a third output multiplexer, R3, Rd4, Rd5 and Rd6 are provided as inputs to a fourth output multiplexer, and Rd4, Rd5, Rd6 and Rd7 are provided as inputs to a fifth output multiplexer.

16. The method of claim 15, wherein each of the first, second, third, fourth and fifth output multiplexers receive a select signal indicating which of the inputs provided to the multiplexers is to be output.

17. The method of claim 10, wherein the data is written to entries in the register file array in accordance with write word lines, wherein a first write word line is enabled for writes to a first port of each entry of each sub-array, and wherein a second write word line is enabled for writes to a second port of each entry of each sub-array.

* * * * *